United States Patent
Medles et al.

(10) Patent No.: US 10,644,914 B2
(45) Date of Patent: May 5, 2020

(54) REFERENCE SIGNAL DETECTION FOR REDUCING CONTROL DECODING COMPLEXITY

(71) Applicant: MEDIATEK SINGAPORE PTE. LTD., Singapore (SG)

(72) Inventors: Abdelkader Medles, Biggleswade (GB); Cyril Valadon, Letchworth Garden (GB)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 72 days.

(21) Appl. No.: 15/833,596

(22) Filed: Dec. 6, 2017

(65) Prior Publication Data

US 2018/0176059 A1 Jun. 21, 2018

Related U.S. Application Data

(60) Provisional application No. 62/436,015, filed on Dec. 19, 2016.

(51) Int. Cl.
*H04L 27/26* (2006.01)
*H04W 72/04* (2009.01)
(Continued)

(52) U.S. Cl.
CPC ....... *H04L 27/2613* (2013.01); *H04W 72/042* (2013.01); *H04W 72/0446* (2013.01); *H04W 72/08* (2013.01); *H04W 72/1289* (2013.01); *H04L 5/0094* (2013.01); *H04L 27/2647* (2013.01)

(58) Field of Classification Search
CPC ............... H04L 27/2613; H04L 5/0094; H04L 27/2647; H04W 72/042; H04W 72/0446; H04W 72/08; H04W 72/1289
See application file for complete search history.

(56) References Cited

U.S. PATENT DOCUMENTS 9,510,219 B2 * 11/2016 Kim ........................ H04L 5/001
2013/0176924 A1 7/2013 Kishiyama et al.
(Continued)

FOREIGN PATENT DOCUMENTS

WO WO 2013/017946 A2 2/2013
WO WO 2015/041576 A1 3/2015
WO WO 2016/039682 A1 3/2016

OTHER PUBLICATIONS

Combined Office Action and Search Report dated Dec. 26, 2018 in Taiwanese Patent Application No. 106144387.

*Primary Examiner* — Luat Phung
(74) *Attorney, Agent, or Firm* — Oblon, McClelland, Maier & Neustadt, L.L.P.

(57) ABSTRACT

Aspects of the disclosure provide a method for reducing physical downlink control channel (PDCCH) decoding complexity at a user equipment (UE) in a wireless communication network. The method can include receiving from a base station a candidate demodulation reference signal (DMRS) sequence that is carried in a subframe and associated with a PDCCH carried in the subframe, calculating a correlation-based quality metric indicating a correlation between the received candidate DMRS sequence and a local DMRS sequence, and performing a PDCCH decoding process to decode the PDCCH when the quality metric is greater than a threshold.

16 Claims, 4 Drawing Sheets

(51) Int. Cl.
*H04W 72/08* (2009.01)
*H04W 72/12* (2009.01)
*H04L 5/00* (2006.01)

(56) References Cited

U.S. PATENT DOCUMENTS

| | | | |
|---|---|---|---|
| 2015/0029976 A1 | 1/2015 | Wang et al. | |
| 2015/0373694 A1* | 12/2015 | You | H04L 5/0051 370/329 |
| 2016/0014812 A1* | 1/2016 | Park | H04L 5/0048 370/329 |
| 2016/0173152 A1* | 6/2016 | Rahman | H04B 1/1027 455/63.1 |
| 2018/0242286 A1* | 8/2018 | Song | H04L 1/0072 |
| 2018/0332491 A1* | 11/2018 | Eckardt | H04L 5/0051 |
| 2019/0037540 A1* | 1/2019 | Seo | H04L 5/00 |
| 2019/0239203 A1* | 8/2019 | Chae | H04B 17/327 |

\* cited by examiner

REFERENCE SIGNAL DETECTION FOR REDUCING CONTROL DECODING COMPLEXITY

INCORPORATION BY REFERENCE

This present disclosure claims the benefit of U.S. Provisional Application No. 62/436,015, "Reference Signal Design for Control Decoding Complexity Reduction" filed on Dec. 19, 2016, which is incorporated herein by reference in its entirety.

TECHNICAL FIELD

The present disclosure relates to wireless communication techniques. Specifically, the present disclosure describes techniques for reducing control channel decoding complexity at a mobile device based on specially designed and allocated reference signal sequences.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In current Long Term Evolution (LTE) system, physical downlink control channel (PDCCH) decoding at a mobile device consumes a significant amount of power. For example, a mobile device may perform PDCCH blind decoding periodically in order to monitor arrivals of downlink control messages transmitted from a base station. The mobile device may execute 44 PDCCH blind decoding attempts in each subframe of a single component carrier in one scenario.

SUMMARY

Aspects of the disclosure provide a first method for reducing physical downlink control channel (PDCCH) decoding complexity at a user equipment (UE) in a wireless communication network. The first method can include receiving from a base station a candidate demodulation reference signal (DMRS) sequence that is carried in a subframe and associated with a PDCCH carried in the subframe, calculating a correlation-based quality metric indicating a correlation between the received candidate DMRS sequence and a local DMRS sequence, and performing a PDCCH decoding process to decode the PDCCH when the quality metric is greater than a threshold.

Embodiments of the first method can further includes receiving a DMRS sequence allocation configuration, and generating the local DMRS sequence according to the DMRS sequence allocation.

In one example, the local or candidate DMRS sequence is UE-specific, or UE group-specific. In one example, the local or candidate DMRS sequence is one of a set of orthogonal or quasi-orthogonal sequences that are orthogonal or quasi-orthogonal across connected UEs in a cell of the base station. In one example, the local or candidate DMRS sequence is one of a set of orthogonal or quasi-orthogonal sequences that are orthogonal or quasi-orthogonal across connected UEs in a cell of the base station and PDCCH aggregation levels. Accordingly, in one example, the first method can further includes performing the PDCCH decoding process to decode the PDCCH associated with the candidate DMRS sequence based on an aggregation level indicated by the local DMRS sequence when the quality metric is greater than the threshold. In one example, the candidate DMRS sequence and the PDCCH associated with the candidate DMRS sequence are carried in a control resource set (CRS) of the subframe.

In an embodiment, the first method can further include monitoring multiple CRSs in the subframe each carrying a candidate DMRS sequence associated with a PDCCH, determining whether the local DMRS sequence is present among the candidate DMRS sequences carried in the multiple CRSs, and performing a PDCCH decoding process to decoding the respective PDCCH associated with the local DMRS when the local DMRS is present.

Aspects of the disclosure provide second method for reducing physical downlink control channel (PDCCH) decoding complexity in a wireless communication network. The second method can include transmitting, from a base station, a subframe including a candidate DMRS sequence allocated to a UE and a PDCCH intended for the UE. Particularly, the candidate DMRS sequence allocated to the UE is one of a set of orthogonal or quasi-orthogonal sequences that are orthogonal across UEs and PDCCH aggregation levels. In one example, the candidate DMRS sequence allocated to the UE and the PDCCH intended for the UE are included in a control resource set (CRS) in the subframe.

In one example, the subframe including multiple CRSs each including a candidate DMRS sequence. Particularly, the candidate DMRS sequences in the multiple CRSs are members of the set of orthogonal or quasi-orthogonal sequences that are orthogonal across connected UEs in a cell of the base station and PDCCH aggregation levels. In one example, the second method further includes transmitting a DMRS sequence allocation configuration to the UE indicating the candidate DMRS sequence allocated to the UE.

Aspects of the disclosure provide a third method for reducing physical downlink control channel (PDCCH) decoding complexity at a user equipment (UE) in a wireless communication network. The method can include receiving from a base station a set of candidate demodulation reference signal (DMRS) sequences that are carried in a subframe and each associated with a PDCCH carried in the subframe, calculating a correlation-based quality metric indicating a correlation between a received candidate DMRS sequence and a local DMRS sequence for received candidate DMRS sequences, ranking the correlation-based quality metrics according to values of the correlation-based quality metrics, and decoding PDCCHs that are associated with a predetermined number of the received candidate DMRS sequences that have highest ranked quality metric values.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
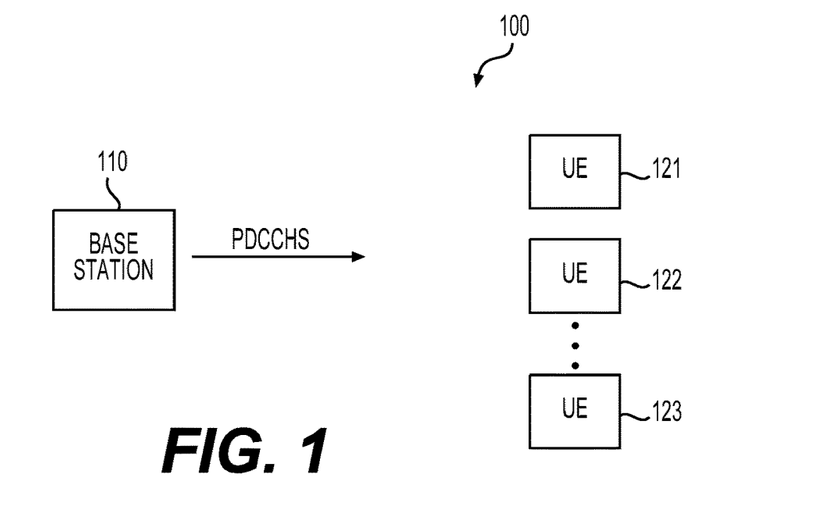
FIG. 1 shows a wireless communication network according to an embodiment of the disclosure.

FIG. 1 shows a wireless communication network 100 according to an embodiment of the disclosure. The wireless communication network 100 can include a base station 110 and a plurality of user equipment (UEs) 121-123. The wireless communication network 100 can employ specially designed and allocated demodulation reference signal (DMRS) sequences to reduce physical downlink control channel (PDCCH) decoding complexity at each of the UEs 121-123, thus saving power consumed for PDCCH decoding at the UEs 121-123.

The wireless communication network 100 can be a network compliant with communication standards developed by the Third Generation Partnership Project (3GPP), such as Long Term Evolution (LTE) standards, New Radio (NR) air interface standards, and the like. Accordingly, the base station 110 can be a node implementing functions of an eNodeB as specified in LTE standards, or a gNB as specified in NR standards. The UEs 121-123 each can be a mobile phone, a laptop, a vehicle carried device, and the like, and capable of communicating with the base station 110 with suitable communication protocols as specified in respective communication standards.

In FIG. 1, the UEs 121-123 can be connected to the base station 110 and operate in radio resource control (RRC) connected mode. Accordingly, the UEs 121-123 can receive and process a sequence of subframes that are continuously transmitted from the base station 110. Each subframe may carry a plurality of PDCCHs carrying downlink control information (DCI) intended for different UEs 121-123 and other types of control information. For example, a PDCCH in a subframe intended for the UE 121 may carry downlink scheduling information for the intended UE 121. Based on content of this PDCCH, the UE 121 can properly receive data carried in the current subframe or following subframes according to the downlink scheduling information. For one of the UE 121-123, a subframe may or may not include a PDCCH intended for this UE. However, each UE 121-123 may not have knowledge in advance about presence of a PDCCH intended for a respective UE in the current subframe.

Accordingly, in a conventional LTE system, a UE may have to monitor arrivals of a PDCCH intended for this UE for each subframe, and carry out a blind decoding process for each subframe. For example, the UE may execute a plurality of blind decoding attempts over one or more search spaces. Each search space may include one or more candidate PDCCHs. The UE may have to decode those candidate PDCCHs one by one to verify if any PDCCH is intended for the UE based on decoded information in those candidate PDCCHs. Number of the blind decoding attempts can reach 40-100 times depending on configurations of the LTE system. The blind decoding process may cost the UE a significant amount of power although there can be a high chance that a subframe may not carry a PDCCH intended for the UE.

According to an aspect of the disclosure, the wireless communication network 100 can employ a decoding complexity reduction scheme to save power of the UEs 121-123. For example, when a PDCCH intended for the UE 121 is to be transmitted, the base station 110 can associate a UE 121-specific DMRS sequence with the PDCCH intended for the UE 121, and transmitted the UE 121-specific DMRS sequence and the PDCCH intended for the UE 121 together in a same subframe. For example, the UE 121-specific DMRS sequence can be a member of a set of orthogonal or quasi-orthogonal sequences. The set of orthogonal or quasi-orthogonal sequences can be specially designed and allocated to each UE 121-123 that is connected to the base station 110 (in RRC connected mode). For other UEs 122-123, UE-specific DMRS sequences can be similarly associated and transmitted with respective PDCCHs intended for the respective UEs. I When the UE 121 receives the subframe carrying the UE 121-specific DMRS sequence and other UE-specific DMRS sequences, the UE 121 can first assess if the UE 121-specific DMRS is present among the UE-specific DMRS sequences in the subframe. For example, a correlation based quality metric can be used to assess each or a portion of the UE-specific DMRS sequences carried in the current subframe. If the UE 121-specific DMRS sequence is detected among the UE-specific DMRS sequences, the UE 121 can proceed to decode the PDCCH intended for the UE 121. Otherwise, when no UE 121-specific DMRS sequence is detected in the subframe, it can be determined that the subframe does not carry the PDCCH intended for the UE 121. Accordingly, no decoding attempts for decoding a PDCCH intended for the UE 121 are performed. In this way, power consumption caused by the blind decoding process can be avoided or reduced.

In addition, compared with performing a blind decoding to find out absence of a PDCCH intended for the UE 121, the absence of a PDCCH intended for the UE 121 can be known earlier by detecting absence of the UE 121-specific DMRS sequence. Accordingly, the receiver circuits at the UE 121 can be switched to a power saving mode earlier for a current subframe, further reducing power consumption of the UE 121.

In addition to indicating a presence of a respective PDCCH, a DMRS sequence can also be used as a pilot sequence for channel estimation. For example, DMRS sequence symbols can be used to obtain a channel estimation that facilitates a coherent demodulation of one or more PDCCHs, or other control channels or data channels.

Figure 2:
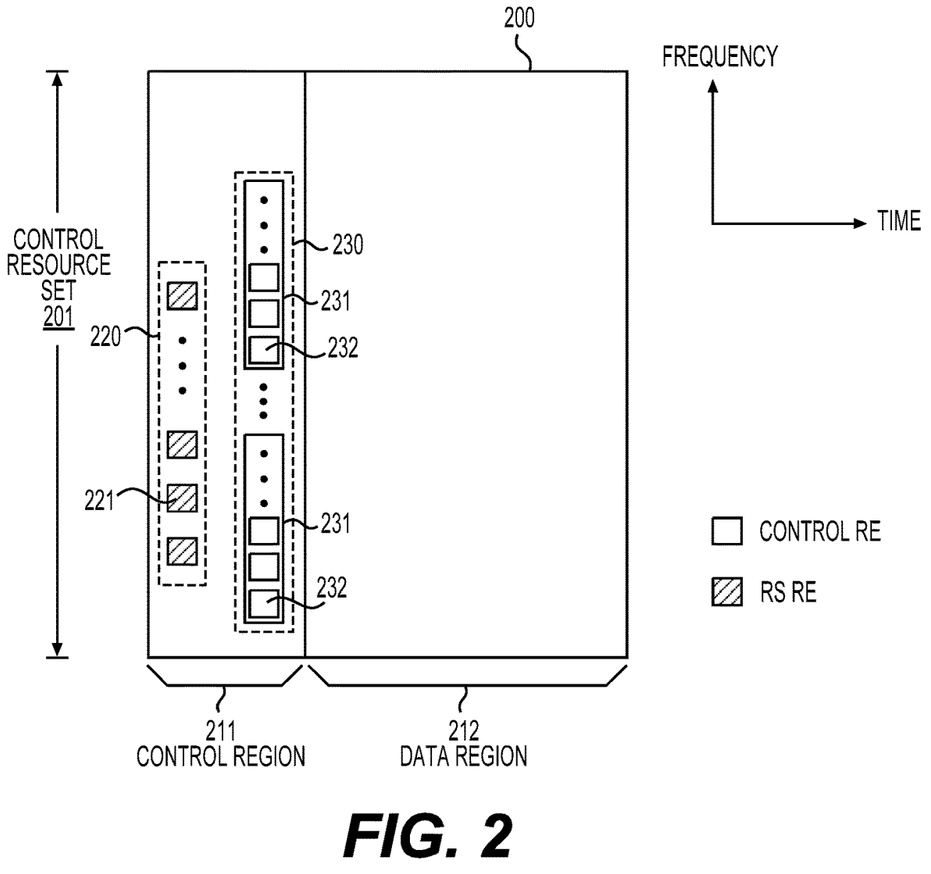
FIG. 2 shows an example of mapping demodulation reference signal (DMRS) sequences and physical downlink control channels (PDCCHs) to resource elements (REs) in a subframe according to some embodiments of the disclosure.

FIG. 2 shows an example of mapping DMRS sequences and PDCCHs to resource elements (RE) in a subframe 200 according to some embodiments of the disclosure. The subframe 200 can be a subframe transmitted from the base station 110 to the UEs 121-123, and can include a plurality of orthogonal frequency division multiplexing (OFDM) symbols in time domain and a plurality of subcarriers in frequency domain. Accordingly, the subframe 200 can include a time-frequency resource grid that includes an array of REs each corresponding to a subcarrier within an OFDM symbol. In one example, the subframe 200 can include a control region 211 and a data region 212 following the control region 211 as shown in FIG. 2.

Particularly, the subframe 200 can include a control resource set (CRS) 201 (also referred to as a control subband). Generally, a CRS refers to a set of physical resource blocks (PRBs) in frequency domain within which PDCCHs are carried. A PRB, as defined in related LTE or NR communication standards, can refer to a block of REs within a certain number of subcarriers in frequency domain and a certain number of OFDM symbols in time domain. In FIG. 2, the CRS 201 can include REs within the control region 211 that can have a width of one or more OFDM symbols. While one CRS 201 is shown in FIG. 1, the subframe 200 can include a plurality of CRSs expanding across a system bandwidth of the wireless communication network 100 in the frequency domain. In addition, different CRS may have different sizes in terms of a number of PRBs. Further, the PRBs belonging to one CRS may not be frequency contiguous in alternative examples.

In one example, the CRS 201 includes a PDCCH 230 intended for a UE, such as the UE 121. The PDCCH 230 can include 1, 2, 4, or 8 control channel elements (CCEs) 231 depending on a size of a DCI message carried in the PDCCH and channel coding rate adopted over the respective DCI message. Each CCE can include a number of REs 232 (referred to as control REs). In one example, a CCE includes 36 REs. The number of CCEs 231 contained in the PDCCH 230 is referred to as an aggregation level of the PDCCH 230. For example, a PDCCH including 8 CCEs is said to have an aggregation level of 8. Accordingly, the UE 121, without knowing the DCI message size and respective channel coding rate, may not have knowledge of a size or aggregation level of the PDCCH 230 in advance. In some examples, the UE 121 may have to try different aggregation levels one by one in order to decode the PDCCH 230 when the aggregation level of the PDCCH 230 is unknown.

In one example, the CRS 201 further includes a DMRS sequence 220. As described above, the DMRS sequence 220 can be one of a set of orthogonal or quasi-orthogonal sequences allocated by the base station 110 to the UEs 121-123, and hence can be UE 121-specific. When the PDCCH 230 intended for the UE 121 is to be transmitted, the BS 110 includes the DMRS sequence 220 in the same subframe 200 carrying the PDCCH 230. In this way, the UE 121-specific DMRS sequence 220 can be associated with the PDCCH 230 intended for the UE 121.

In one example, the DMRS sequence 220 is mapped to a sequence of REs 221, referred to as RS REs, according to a DMRS mapping pattern. The DMRS mapping pattern can define positions of each RS RE 221 for mapping the DMRS sequence 220. In one example, the RS REs 221 is included in a first OFDM symbol of the subframe 200, such that channel estimation based on the DMRS sequence 220 can start early to reduce delay in decoding the PDCCH 230. In one example, the RS REs 221 are evenly spaced in frequency domain, for example, with a spacing of 3 REs. While the RS REs 221 and control REs 232 are shown to be located in separate columns in the CRS 201 in FIG. 2 (which is not an accurate illustration of DMRS or PDCCH resource mapping), the RS REs 221 and the control REs can be mixed with each other, for example, within the first OFDM symbol. In addition, remaining REs within the CRS 201 can be allocated for data information transmission or other types of RSs if the CRS 201 is not fully occupied by RS REs or control REs.

The subframe 200 can include a plurality of CRSs that can have a similar structure as the CRS 201. For example, each CRS can include a PDCCH intended for a respective UE. A DMRS sequence allocated for the respective UE can be included in the respective CRS according to a similar DMRS mapping pattern and associated with the respective PDCCH. In addition, one subframe can carry one or more PDCCHs intended for a same UE but distributed in different CRSs.

Based on the resource mapping configurations and subframe structure described above, the UE 121 can perform a DMRS detection process to determine whether the UE 121-specific DMRS sequence 220 is present in the subframe 200 while receiving and processing the subframe 200. For example, the UE 121 can monitor one or more CRSs in each subframe. The UE 121 can know locations of the one or more CRSs being monitored and the DMRS mapping pattern in each subframe in advance according to a configuration. The configuration can be, for example, received from the base station 110 when a RRC connection is initially established following an initial access procedure. Accordingly, for each CRS being monitored, the UE 121 can locate a DMRS sequence at positions defined by the DMRS mapping pattern, and perform demodulation to obtain the DMRS sequence. A DMRS sequence obtained from a CRS can be referred to as a candidate DMRS sequence that needs to be assessed subsequently.

On the other side, the UE 121 can generate the UE 121-specific DMRS sequence at local. For example, the BS 110 makes decisions regarding allocation of orthogonal or quasi-orthogonal sequences among the UEs 121-123. The allocation results can be provided to the UE 121, for example, when a RRC connection is initially established for the UE 121. The results can be in a form of a set of parameters. Based on the set of parameters, the UE 121 can locally construct the UE 121-specific DMRS sequence. A locally generated UE-specific DMRS sequence can be referred to as a local sequence in contrast to received candidate DMRS sequences.

Based on the local DMRS sequence and one or more received candidate DMRS sequences, the UE 121 can determine whether any one of the candidate DMRS sequences can be deemed as the local DMRS sequence. In one example, the determination can be performed using a correlation-based quality metric Q indicating a correlation between a candidate DMRS sequence and a local DMRS sequence. Specifically, a quality metric Q can first be calculated based on the local sequence and one candidate sequence. The calculated quality metric Q can then be compared with a threshold. If the quality metric Q is greater than the threshold, it means that the local and candidate sequences have a high correlation. Accordingly, it can be determined that the respective two sequences being compared are a same sequence, and hence the local DMRS sequence can be determined to be present among the candidate DMRS sequences.

If the quality metric is smaller than the threshold, it can be determined that the respective two sequences are different from each other. For example, a CRS being monitored by the UE 121 may be allocated to another UE among the UEs 122-123, and does not carry a PDCCH intended for the UE 121 or the UE 121-specific DMRS sequence. For example, the CRS being monitored is allocated to the UE 122, and carries a UE 122 specific DMRS sequence. As the UE 121-specific DMRS sequence and the UE-122 specific DMRS sequence are orthogonal or quasi-orthogonal with each other, the calculated correlation-based quality metric Q would be zero (for usage of orthogonal sequences assuming a noiseless channel) or a small value (for usage of quasi-orthogonal sequences).

As an example, for a flat fading channel, the quality metric Q for determining a correlation between a local and a candidate sequences can take one of the following forms for frequency contiguous CRSs and frequency distributed CRSs, respectively:

$$Q = \frac{1}{N_{RS}} \frac{\left| \sum_{m=0}^{N_{RS}-1} y_m^{RS} x_{RS}^*(m) \right|^2}{\sum_{m=0}^{N_{RS}-1} |y_m^{RS}|^2}, \text{ for contiguous } CRS;$$

$$Q = \frac{1}{N_{RS}} \sum_{n=0}^{N_{PRB}-1} \frac{\left| \sum_{m=0}^{N_{RS}/N_{PRB}-1} y_m^{RS} x_{RS}^*(m) \right|^2}{\sum_{m=0}^{N_{RS}/N_{PRB}-1} |y_m^{RS}|^2}, \text{ for distributed } CRS.$$

In the above expressions, $x_{RS}(m)$, m=0: $N_{RS}-1$, represents a local DMRS sequence with a length of $N_{RS}$, $y_m^{RS}$, m=0: $N_{RS}-1$, represents a candidate DMRS sequence with a length of $N_{RS}$, and $N_{PRB}$ represents a number of PRBs included in the frequency distributed CRS.

According to the disclosure, an optimal threshold used in the above DMRS sequence detection process can depend on RS quality metric used, channel coding rate of a DCI message, length of the DCI message (DCI format), aggregation level of respective PDCCH, frequency contiguous or distributed PRBs allocation, RS density per PRB, and ratio of coherent channel frequency width to CRS frequency width.

Alternatively, other than employment of a threshold for determining presence of a DMRS sequence (which is referred to as a threshold based detection), a ranking mechanism (referred to as ranking based detection) can be used. For example, the quality metrics for different candidate DMRS sequences can be ranked in descending order of the mostly likely to be present to the least likely, and only a small number 'N' (a pre-defined or a configured constant of 1 or greater than 1) of the highest ranked candidates is determined to be present.

Based on the DMRS detection results, the UE 121 can determine whether to proceed to decode a PDCCH. For the example of the subframe 200, the UE 121 can determine that the DMRS sequence 220 is present in the CRS 201, and subsequently proceed to decode the DPCCH 230. Assuming no UE 121-specific DMRS is detected among the CRSs being monitored, the UE 121 would not proceed to perform any PDCCH decoding. In this way, blind decoding of PDCCHs can be avoided.

In the above description, a PDCCH decoding process is performed after determining a presence of the DMRS sequence 220. However, as the PDCCH 230 can have one of multiple different aggregation levels, and the UE 121 is not aware of the exact aggregation level of the PDCCH 230, the UE 121 may have to try different hypotheses of aggregation levels to conduct the PDCCH decoding. To further improve power efficiency, in an alternative example, a set of DMRS sequences that are orthogonal or quasi-orthogonal across UEs and aggregation levels is employed in the network 100. For example, the set of orthogonal and quasi-orthogonal DMRS sequences can be associated with different aggregation levels of each UE 121-123 when used for PDCCH transmissions. Each of the UE 121-123 can be allocated with multiple DMRS sequences corresponding to different aggregation levels of the respective UE. For example, PDCCHs can have aggregations levels of 1, 2, 4, and 8 in the network 100. Accordingly, each UE 121-123 can be allocated with 4 DMRS sequences corresponding to the 4 aggregation levels, respectively.

For example, when the UE 121 performs a DMRS detection process over the CRS 201, the UE 121 can try the 4 allocated DMRS sequences one by one to calculate the quality metric Q until a matched DMRS sequence is detected, or all 4 DMRS sequences are tested without detecting any matched DMRS sequence. As a result, when a matched DMRS sequence is detected, not only a presence of a PDCCH is determined, but also an aggregation level of the PDCCH. Thereafter, the UE 121 can proceed to decode the PDCCH based on a determined aggregation level. If no matched DMRS sequence is detected after the 4 allocated DMRS is exhausted, no decoding would be conducted. In alternative examples where ranking based detection is used for multiple candidate DMRS sequences, each of multiple DMRS sequences corresponding to different aggregation levels can be used against the multiple candidate DMRS sequences to generate a list of ranked quality metrics and respective candidate DMRS sequences.

While in the above examples, usage of UE-specific DMRS sequences for reducing PDCCH decoding complexity is described, in alternative examples, UE group-specific DMRS sequences can also be employed to reduce PDCCH decoding complexity. For example, a PDCCH, referred to as a common PDCCH, can carry a control message for multicast or broadcast control signaling. Such a common PDCCH is intended for a group of UEs, and needs to be detected by multiple UEs. Accordingly, a UE group-specific DMRS sequence can be used for association with the common PDCCH, and allocated to a group of UEs. Similarly, DMRS sequences orthogonal or quasi-orthogonal across UE groups and aggregation levels can be employed to distinguishing different aggregation levels during DMRS sequence detection processes for decoding common PDCCHs.

While one DMRS sequence 220 and one PDCCH 230 are shown in FIG. 2, in alternative examples, the control resource set 201 may include multiple pairs of a PDCCH and an associated DMRS sequence. Each pair of the PDCCH and the DMRS sequence may correspond to a different UE. For example, the multiple DMRS sequences can be mapped to different positions in the CRS 201 according to different mapping patterns. During a DMRS detection process over the CRS 201, the UE 121 can locate a DMRS sequence according to a mapping pattern configured for the UE 121 to conduct the DMRS sequence presence detection.

As described above, the DMRS sequences can either be quasi-orthogonal sequences or orthogonal sequences. Typically, orthogonal sequences can have a higher performance than quasi-orthogonal sequences in terms of percentage of saved PDCCH blind decoding attempts. However, quasi-orthogonal sequences may be more flexible than orthogonal sequences in terms of sequence availability and sequence allocation.

Below is an example of a quasi-orthogonal DMRS sequence, $x_{RS}(m)$, $$x_{RS}(m) = \frac{1}{\sqrt{2}}(1 - 2 \cdot c(2m)) + j\frac{1}{\sqrt{2}}(1 - 2 \cdot c(2m+1)), \quad (1)$$

$$m = 0, 1, \ldots, N_{RS} - 1.$$

In the above expression (1), $N_{RS}$ represents a length of the sequence $x_{RS}(m)$ (a number of sequence symbols), and c(i)

represents a pseudo-random scrambling sequence, such as a Gold sequence, that can be generated with a following initialization value, $$c_{init} = \text{Agg\_level} \cdot (2N_{ID}^{cell}+1)2^{16}+n_{RNTI}. \quad (2)$$

In the above expression (2), Agg_level represents an aggregation level of a PDCCH intended for a UE, such as the UE 121, $N_{ID}^{cell}$ represents a cell identity (ID), such as a physical cell ID of a cell covering the UEs 121-123 in FIG. 1, and $n_{RNTI}$ represents a radio network temporary identifier (RNTI) which can be an ID associated with a UE (unicast), a group of UE (multicast), or all UE (broadcast) in connected mode.

For example, the above quasi-orthogonal sequence (1) can be employed in the wireless communication network 100. A set of sequence configuration parameters indicating the usage of the quasi-orthogonal sequence (1) can be signaled to the UE 121 when an RRC connection is initially established between the UE 121 and the base station 110. When a PDCCH intended for the UE 121 is to be transmitted, the base station 110 can generate a candidate DMRS sequence according to the expression (1) with an initialization value generated according to the expression (2). Particularly, an aggregation level of the to-be-transmitted PDCCH and an RNTI associated with the UE 121 can be used for generating the initialization value. As a result, a candidate DMRS corresponding to the UE 121 and the respective PDCCH aggregation level can be generated. The base station 110 can then associate the generated candidate DMRS sequence with the to-be-transmitted PDCCH by including the generated candidate DMRS sequence and the to-be-transmitted PDCCH in a same CRS in the to-be-transmitted subframe.

At the UE 121 side, the UE 121 can similarly generate a local DMRS sequence based on the expressions (1) and (2) according to the set of received sequence configuration parameters (indicating usage of the expressions (1) and (2)), and other parameters (such as $N_{ID}^{cell}$ and $n_{RNTI}$) obtained from other configurations signaled from the base station 110. The UE 121 can then perform a DMRS detection process to determine a presence of the candidate DMRS sequence.

An example of an orthogonal sequence is shown as follows, $$x_{RS}(m, \text{offset}) = s(m) \cdot w^k(m), m=0,1, \ldots, N_{RS}-1. \quad (3)$$

In the above expression (3), s(m) represent a quasi-orthogonal sequence similar to the sequence generated according to the expression (1), however, the pseudo-random scrambling sequence c(i) can have a different initialized value represented as follows, $$c_{init} = (2N_{ID}^{cell}+1)2^{16}+n_{VID}. \quad (4)$$

In the expression (4), the $n_{VID}$ can be a virtual ID. In some examples, the virtual ID $n_{VID}$ can be used to separate between spatial beams in beam-formed communication, or can be used for providing additional DMRS sequences when orthogonal codes $w^k(m)$ are exhausted for allocation. Additionally, the virtual ID $n_{VID}$ can be used for support of distinguishing different aggregation levels.

The $w^k(m)$ can represent an orthogonal sequence (or code) allocated to one of the UEs 121-123. A design of the orthogonal code $w^k(m)$ can be based on discrete Fourier transform (DFT), Walsh Hadamard, or any other orthogonal family of codes. Generally, for a given CRS including $N_{RS}$ number of RS REs, there can be at most $N_{RS}$ number of orthogonal codes. Accordingly, for this CRS, at most $N_{RS}$ number of UEs or UR groups can share the $N_{RS}$ number of orthogonal codes when aggregation levels are not considered. When aggregation levels are considered, for example, 4 optional aggregation levels, at most $N_{RS}/4$ number of UEs or UR groups can share the $N_{RS}$ number of orthogonal codes that are orthogonal across the respective UE or UE groups as well as different aggregation levels.

The offset can represent a starting frequency offset of mapping positions of a DMRS sequence in a CRS in frequency domain. When different starting frequency offsets are configured, the offsets corresponding to different UEs are signaled to respective UEs, such that the respective UEs know mapping locations of respective DMRS sequences.

Figure 3A:
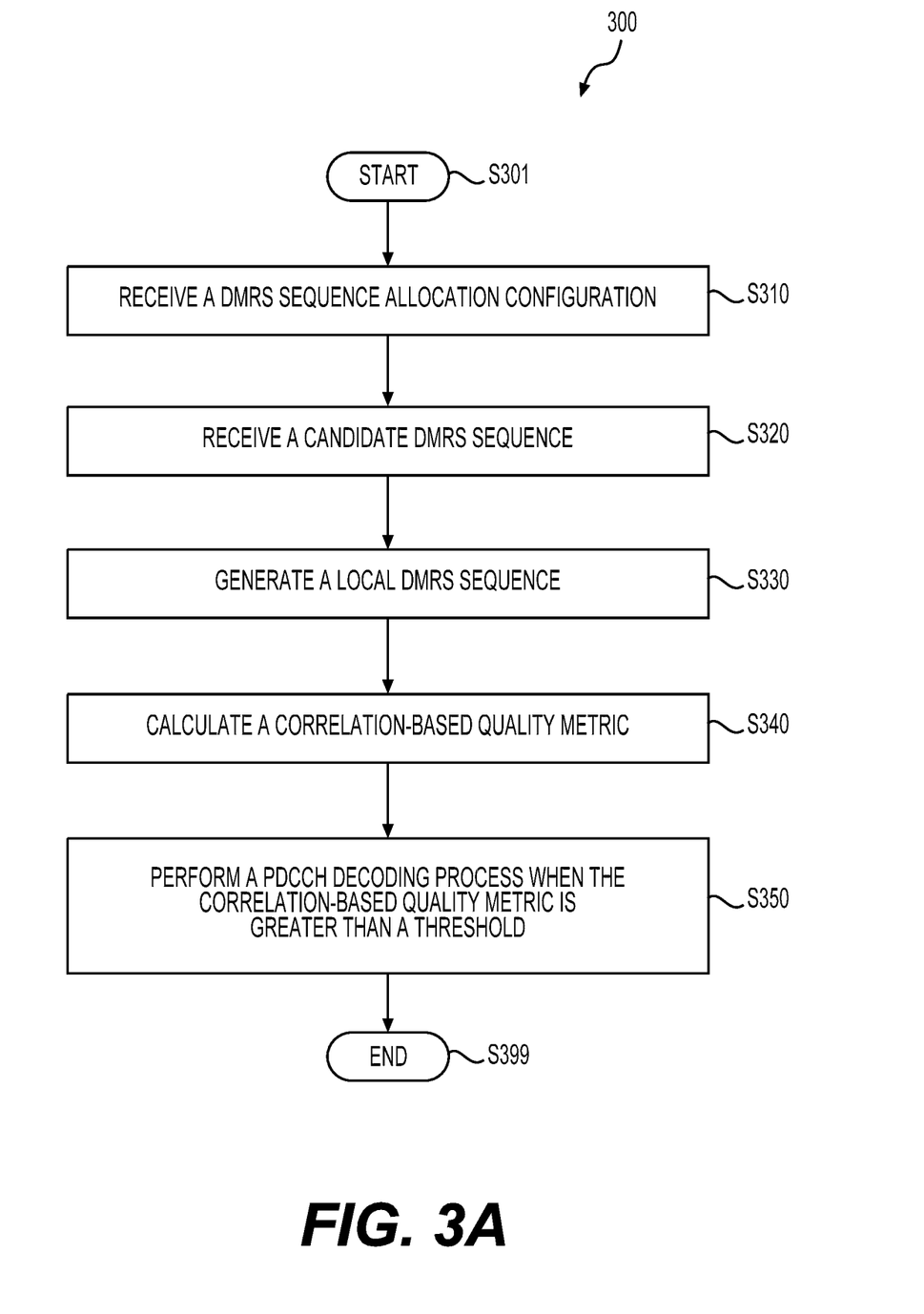
FIG. 3A shows a first example process for reducing PDCCH decoding complexity according to an embodiment of the disclosure.

FIG. 3A shows an example process 300 for reducing PDCCH decoding complexity according to an embodiment of the disclosure. The process 300 can be performed at the UE 121 in FIG. 1 example. The wireless communication network 100 in FIG. 1 example is used as an example to explain the process 300. The process can start from S301 and proceed to S310.

At S310, a DMRS sequence allocation configuration can be received at the UE 121. For example, the DMRS sequence allocation configuration can be signaled from the base station 110 to the UE 121 when an RRC connection is initially established between the UE 121 and the base station 110. The UE 121 can be one of a plurality of UEs 121-123 that are belong to a cell of the base station 110 and are in RRC connected mode. The DMRS sequence allocation configuration can indicate one or more DMRS sequences that are members of a set of orthogonal or quasi-orthogonal sequences, and are allocated to the UE 121. For example, the set of orthogonal or quasi-orthogonal sequences can be orthogonal or quasi-orthogonal across different UEs 121-123, or across different UE groups.

Alternatively, the set of orthogonal or quasi-orthogonal sequences can be orthogonal or quasi-orthogonal across different UEs, different UE groups, and different PDCCH aggregation levels. In one example, the DMRS sequence allocation configuration can include a set of parameters such that one or more local DMRS sequence can be generated based on the set of parameters. For example, the set of parameters include parameters needed for constructing an orthogonal code $w^k(m)$ included in the expression (3). In one example, no DMRS sequence allocation configuration is signaled to the UE 121, and the UE 121 can generate a local DMRS based on a predetermined method known to both the UE 121 and the base station 110, for example, represented by the expressions (1) and (2).

At S320, a candidate DMRS sequence in a subframe can be received at the UE 121. For example, the candidate DMRS sequence can be one of the set of orthogonal or quasi-orthogonal sequences that are allocated among the UEs 121-123. The candidate DMRS sequence can be previously allocated to a specific UE, thus included in a CRS that this specific UE is being monitored for each subframe. In addition, a PDCCH intended for this specific UE can be included in the same CRS carrying the candidate DMRS sequence. Accordingly, the candidate DMRS sequence can indicate a presence of the PDCCH intended for this specific UE. The specific UE can be the UE 121 or one of other UEs 122-123.

At S330, a local DMRS sequence can be generated based on the DMRS sequence allocation configuration received at S310. Alternatively, the local DMRS sequence can be generated without receiving any DMRS sequence allocation configuration information from the base station 110.

At S340, a correlation-based quality metric can be calculated based on the local DMRS sequence and the candidate DMRS sequence received at S320. The quality metric can indicate a correlation between the local and the candidate DMRSs.

At S350, a PDCCH decoding process can be performed at the UE 121 when the correlation-based quality metric is greater than a threshold. For example, the correlation-based quality metric can be compared with the threshold. When the correlation-based quality metric is greater than the threshold, it can be determined that the local DMRS sequence is present in the CRS, and thus the PDCCH carried in the CRS is intended for the UE 121. The PDCCH decoding process can be accordingly carried out. Otherwise, it can be determined that the local DMRS sequence is not present in the CRS, and thus the PDCCH carried in the CRS is not intended for the UE 121. As a result, no PDCCH decoding will be conducted, and power consumed for PDCCH decoding can be saved.

When the local DMRS sequence is a member of a set of sequences orthogonal or quasi-orthogonal across UEs and aggregation levels, the local DMRS sequence can indicate one of multiple PDCCH aggregation levels. Accordingly, when the correlation-based quality metric is greater than the threshold, the UE 121 can perform the PDCCH decoding process with knowledge of the aggregation level of the PDCCH intended for the UE 121. Specifically, the PDCCH decoding process can be performed over a search space based on the known aggregation level (such as aggregation level of 2), and decoding over other search spaces based on other aggregation levels (such as aggregation levels of 1, 4, 8) can be avoided. As a result, power consumed for PDCCH decoding can be further saved compared with PDCCH decoding without aggregation level information. The process 300 can proceed to S399 and terminate at S399.

Figure 3B:
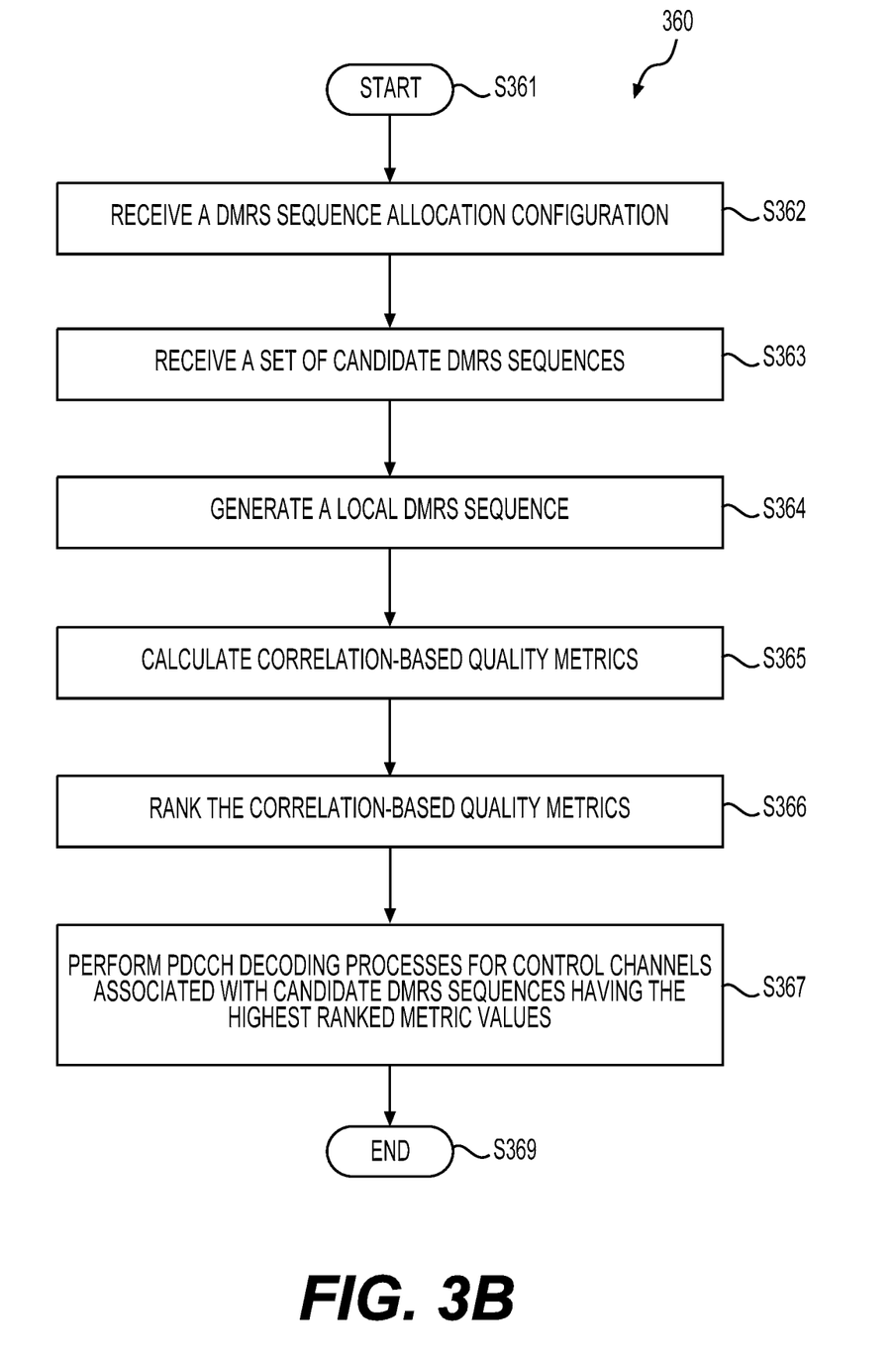
FIG. 3B shows a second example process for reducing PDCCH decoding complexity according to an embodiment of the disclosure.

FIG. 3B shows another example process 360 for reducing PDCCH decoding complexity according to an embodiment of the disclosure. The process 360 employs ranking based detection scheme. The process 360 can be performed at the UE 121 in FIG. 1 example. The wireless communication network 100 in FIG. 1 example is used as an example to explain the process 360. The process can start from S361 and proceed to S362.

At S362, a DMRS sequence allocation configuration can be received at the UE 121 as similarly performed at S310 in the process 300.

At S363, a set of candidate DMRS sequences in a subframe can be received at the UE 121. For example, the UE 121 can monitor multiple CRSs, and obtain multiple candidate DMRS sequences. The set of candidate DMRS sequences can include one or more candidate DMRS sequences.

At S364, a local DMRS sequence can be generated as similarly performed at S330 in the process 300.

At S365, correlation-based quality metrics corresponding to each of the candidate DMRS sequences received at S363 can be calculated based on the local DMRS sequence and the received candidate DMRS sequences. The quality metric can indicate a correlation between the local and the candidate DMRSs.

At S366, the quality metrics calculated at S365 can be ranked. For example, the ranking can be performed according to values of the quality metrics from the largest to the lowest. Based on the ranking, a number N of the candidate DMRS sequences having quality metric values with the highest ranks can be determined to be present.

At S367, PDCCH decoding processes can be performed at the UE 121 for PDCCHs associated with the candidate DMRS sequences with the highest ranked metric values. The process can proceed to S367, and terminate at S369.

Figure 4:
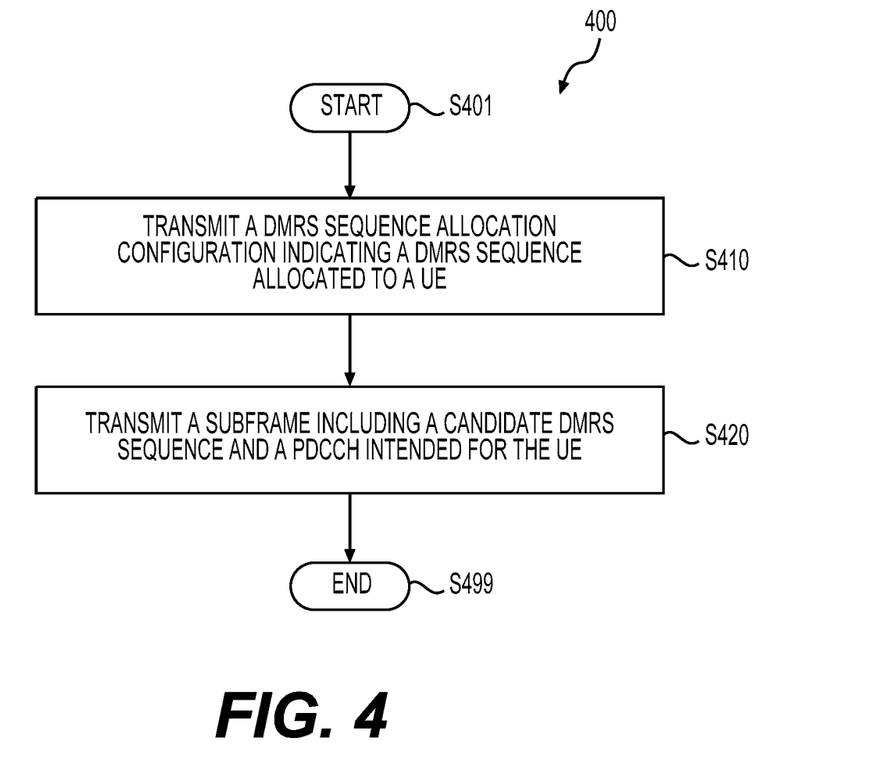
FIG. 4 shows a third example process for reducing PDCCH decoding complexity according to an embodiment of the disclosure.

FIG. 4 shows an example process 400 for reducing PDCCH decoding complexity according to an embodiment of the disclosure. The process 400 can be performed at the base station 110 in FIG. 1 example. The wireless communication network 100 in FIG. 1 example is used as an example to explain the process 400. The process can start from S401 and proceed to S410.

At S410, a DMRS sequence allocation configuration can be signaled from the base station 110 to a UE, such as the UE 121. The DMRS sequence allocation configuration can be similar to that received at S310 in the process 300. Particularly, the DMRS sequence allocation information can indicate a DMRS sequence allocated to the UE 121.

At S420, a subframe including a candidate DMRS sequence that is the sequence allocated to the UE 121 and a PDCCH intended for the UE 121 can be transmitted from the base station 110 to the UEs 121-123. Particularly, the candidate DMRS sequence can be a member of a set of DMRS sequences that are orthogonal or quasi-orthogonal across different UEs and UE groups, or across different UEs and UE groups as well as different PDCCH aggregation levels. When UE 121 receives the subframe, the UE 121 can perform the steps of S320-S350 in the process 300 to obtain the PDCCH intended for the UE 121. For other UEs 122-123, the steps of S320-S340 can be similarly performed. However, a correlation-based quality metric calculated at S340 can be smaller the threshold, because the candidate DMRS sequence carried in the subframe is the sequence allocated to the UE 121, thus can be orthogonal or quasi-orthogonal to a local DMRS sequence of the UE 122-123. Accordingly, no PDCCH decoding will be conducted at the UEs 122-123.

Figure 5:
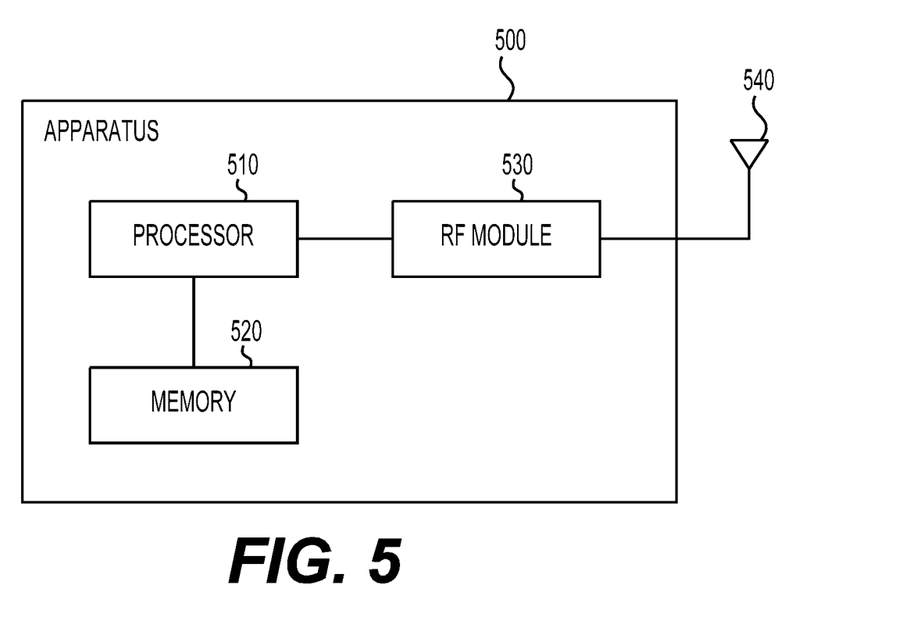
FIG. 5 shows an example apparatus according to some embodiments of the disclosure.

FIG. 5 shows an example apparatus 500 according to some embodiments of the disclosure. The apparatus 500 can implement various embodiments of the disclosure. The apparatus 500 can include a processor 510, a memory 520, and a radio frequency (RF) module 530. Those components are coupled together as shown in FIG. 5. In some examples, the apparatus 500 can be used to implement the base station 110 in FIG. 1 example. Accordingly, the processor 510 can be configured to perform various functions or processes performed by the base station 110 described herein. In other examples, the apparatus 500 can be used to implement one of the UEs 121-123 in FIG. 1 example. Accordingly, the processor 510 can be configured to perform various functions or processes performed by one of the UEs 121-123 described herein.

The processor 510 can be implemented with hardware, software, or a combination thereof. In some examples, the processor 510 can be implemented with application specific integrated circuits (ASIC), field programmable gate arrays (FPGA), and the like, that include circuitry. The circuitry can be configured to perform various functions described herein. In one example, the memory 520 can store program instructions that cause the processor 510 to perform various functions. The memory 520 can include read only memory (ROM), random access memory (RAM), flash memory, a hard disk drive, and the like. The RF module 530 can receive a digital signal from the processor 510 and transmits the signal to a receiver via an antenna 540, or receive a wireless signal from a transmitter and accordingly generates a digital signal which is supplied to the processor 510. The RF module 530 can include digital to analog (DAC)/analog to digital (CAD) converters, frequency down/up converters, filters, and amplifiers for reception and transmission operations.

The apparatus 500 can optionally include other components, such as input and output devices, additional CPU or signal processing circuitry, and the like. Accordingly, the apparatus 500 may be capable of performing other additional functions, such as executing application programs, and processing alternative communication protocols.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for reducing physical downlink control channel (PDCCH) decoding complexity at a user equipment (UE) in a wireless communication network, comprising:
monitoring multiple control resource sets (CRSs) in a subframe to receive from a base station a set of candidate demodulation reference signal (DMRS) sequences each associated with a PDCCH carried in the subframe, each CRS carrying one of the candidate DMRS sequences and the respective associated PDCCH;
calculating a correlation-based quality metric for each of the received candidate DMRS sequences indicating a correlation between the respective candidate DMRS sequence and a local DMRS sequence;
when one of the quality metrics for each of the plurality of candidate DMRS sequences is greater than a threshold, determining the PDCCH associated with the candidate DMRS sequence corresponding to the one of the quality metrics is intended for the UE, and performing a PDCCH decoding process to decode the PDCCH intended for the UE; and
when none of the quality metrics for each of the plurality of candidate DMRS sequences is greater than the threshold, determining there is no PDCCH intended for the UE present in the subframe.

2. The method of claim 1, further comprising:
receiving a DMRS sequence allocation configuration; and
generating the local DMRS sequence according to the DMRS sequence allocation.

3. The method of claim 1, wherein the local or candidate DMRS sequences are UE-specific, or UE group-specific.

4. The method of claim 1, wherein the local or candidate DMRS sequences are members of a set of orthogonal or quasi-orthogonal sequences that are orthogonal or quasi-orthogonal across connected UEs in a cell of the base station.

5. The method of claim 1, wherein the local or candidate DMRS sequences are members of a set of orthogonal or quasi-orthogonal sequences that are orthogonal or quasi-orthogonal across connected UEs in a cell of the base station and PDCCH aggregation levels.

6. The method of claim 5, wherein the performing the PDCCH decoding process includes:
performing the PDCCH decoding process to decode the PDCCH intended for the UE based on an aggregation level indicated by the local DMRS sequence.

7. A method for reducing physical downlink control channel (PDCCH) decoding complexity in a wireless communication network, comprising:

transmitting, from a base station, a subframe including multiple control resource sets (CRSs) each carrying a candidate DMRS sequence allocated to a UE and a PDCCH intended for the UE,
wherein the candidate DMRS sequence allocated to the UE is one of a set of orthogonal or quasi-orthogonal sequences that are orthogonal across UEs and PDCCH aggregation levels, and
the candidate DMRS sequence allocated to the UE indicates the PDCCH intended for the UE is present in the subframe such that the UE can determine whether the PDCCH intended for the UE is present in the subframe by detecting the candidate DMRS sequence allocated to the UE.

8. The method of claim 7, wherein the candidate DMRS sequences in the multiple CRSs are members of the set of orthogonal or quasi-orthogonal sequences that are orthogonal across connected UEs in a cell of the base station and PDCCH aggregation levels.

9. The method of claim 7, further comprising:
transmitting a DMRS sequence allocation configuration to the UE indicating the candidate DMRS sequence allocated to the UE.

10. A method for reducing physical downlink control channel (PDCCH) decoding complexity at a user equipment (UE) in a wireless communication network, comprising:
monitoring multiple control resource sets (CRSs) in a subframe to receive from a base station a set of candidate demodulation reference signal (DMRS) sequences each associated with a PDCCH carried in the subframe, each CRS carrying one of the candidate DMRS sequences and the respective associated PDCCH, each of the candidate DMRS sequences being associated with at least one of UEs served by the base station such that the respective UE can determine a presence of the respective PDCCH intended for the respective UE by detecting a presence of the respective candidate DMRS;
calculating a correlation-based quality metric indicating a correlation between the respective candidate DMRS sequence and a local DMRS sequence for each of the received candidate DMRS sequences;
ranking the correlation-based quality metrics according to values of the correlation-based quality metrics; and
decoding PDCCHs that are associated with a predetermined number of the received candidate DMRS sequences that have highest ranked quality metric values.

11. The method of claim 10, further comprising:
receiving a DMRS sequence allocation configuration; and
generating the local DMRS sequence according to the DMRS sequence allocation.

12. The method of claim 10, wherein the local or candidate DMRS sequences are UE-specific, or UE group-specific.

13. The method of claim 10, wherein the local DMRS sequence or the set of candidate DMRS sequences are members of a set of orthogonal or quasi-orthogonal sequences that are orthogonal or quasi-orthogonal across the UEs served by the base station.

14. The method of claim 10, wherein the local DMRS sequence or the set of candidate DMRS sequences are members of a set of orthogonal or quasi-orthogonal sequences that are orthogonal or quasi-orthogonal across the UEs served by the base station and PDCCH aggregation levels.

15. The method of claim 14, wherein the decoding the PDCCHs includes:
  decoding the PDCCHs that are associated with the predetermined number of the received candidate DMRS sequences based on an aggregation level indicated by the local DMRS sequence.

16. A method for reducing physical downlink control channel (PDCCH) decoding complexity at a user equipment (UE) in a wireless communication network, comprising:
  receiving from a base station a candidate demodulation reference signal (DMRS) sequence that is carried in a subframe and associated with a PDCCH carried in the subframe;
  calculating a correlation-based quality metric indicating a correlation between the received candidate DMRS sequence and a local DMRS sequence, wherein the candidate DMRS sequence or the local DMRS sequence is one of a set of orthogonal or quasi-orthogonal sequences that are orthogonal or quasi-orthogonal across connected UEs in a cell of the base station and PDCCH aggregation levels; and
  when the quality metric is greater than a threshold, determining the PDCCH associated with the candidate DMRS sequence is intended for the UE, and performing a PDCCH decoding process to decode the PDCCH intended for the UE based on an aggregation level indicated by the local DMRS sequence.

* * * * *